Patented June 9, 1931

1,809,797

UNITED STATES PATENT OFFICE

FRANK J. CAHN, OF MILWAUKEE, WISCONSIN

PRODUCTION OF ORGANIC ACIDS BY FERMENTATION

No Drawing. Application filed January 4, 1929. Serial No. 330,435.

The present invention relates to improvements in the manufacture of citric acid by fermentation, and may also be applied to the production of other organic acids resulting from fungicidal action, for example, oxalic acid, malic acid, succinic acid, or fumaric acid.

It has hitherto been proposed to produce such acids, for example, citric acid, by the action of selected fungi upon prepared culture media containing fructose-yielding carbohydrates in the form of solutions or of gels containing gelatine or agar-agar. As fructose-yielding carbohydrates I include fructose, and carbohydrates such as sucrose and inulin which on hydrolysis yield fructose. The fungi employed are ordinarily of the genera Aspergillus, Penicillium, Citromycetes, Mucor, etc., selected strains being employed, which are found to produce the desired acid in maximum proportions by action upon sucrose. For other acids, additional genera of fungi are of use; for example, in addition to the above, various strains of rhizopus may also be employed in the production of fumaric and succinic acids. The propagation of the fungi for the production of spores or fungus tissue to be employed in inoculating the material fermented in accordance with the present invention and the selection of strains for the production of the desired acid being well known in the art, they will not be described further in the present specification.

It has been found that substantially increased yields of citric acid and other acids as desired, based upon the fructose-yielding carbohydrate, such as sucrose, present, are produced by causing the selected strains of fungi to ferment upon slices or sections of sucrose-yielding plants such as slices of sugar beets or Jerusalem artichoke tubers, or sections of sugar cane or sorghum cane. The fermentation is caused to take place in tanks, chambers, or vats, into which slices of sugar beets or sections of the other vegetable materials containing sucrose are placed and inoculated with spores or tissues of the selected strain of fungus. It is preferred that these tanks or vats be closed so that the supply of air or oxygen thereto may be controlled, it having been found that the period for completing the fermentation may be substantially decreased by forcing air or oxygen into the tanks in which the fermentation takes place. Tanks such as are ordinarily used in the diffusion process for extracting the sucrose from sugar beet slices may suitably be employed. The slices may be coarse or fine, as desired, coarser slices being preferable with softer or fleshier materials. For example, with sugar beets ⅛ to ½ inch slices are suitable. The sizes of the slices or sections may, of course, be widely varied in size.

With the firmer varieties of materials treated, such as the more woody growths of sugar beets and the sections of sugar cane, no special arrangement of the material in the tanks is required, it retaining sufficient firmness during fermentation to prevent such packing as would hinder the free circulation of air throughout the mass or packing together of the particles of material in a manner to limit the extent of the fermentative action of the fungus. With softer materials, such as the more fleshy growths of sugar beet, it is advisable to dispose the slices or sections of the material in layers between which open grids of wood, Monel metal or other resistant material, horizontal chains, or layers of open packing material such as Raschig rings are interposed. Likewise, irregular blocks or sections of packing material, suitably stoneware, may be intermixed throughout the entire mass.

Coils or transverse pipes may be placed at vertically spaced intervals in the tanks or vats, serving to support the material undergoing fermentation in the same manner as the grids, etc. above referred to, and a cooling or heating medium may be passed therethrough in order to control the temperature of the fermentation. Thus, in the beginning of the operation, a heating medium such as hot water may be passed therethrough, to accelerate the initial fermentation and growth of the fungus; and at later periods, as the heat of fermentation makes itself apparent, a cooling medium may be supplied.

The tank or vat may be jacketed for external heating or cooling for similar purposes.

By employing the carbohydrate-containing vegetable slices or sections in place of the liquid or gelled culture media hitherto employed, I have found that a substantially increased proportion of the sugar present is converted into the desired acid; for example, the amount of citric acid produced by selected strains of Aspergillus is in excess of 66% of the amount of sucrose present when beet sugar slices are employed, whereas with the culture media hitherto used, employing the same strain of fungus it has been difficult to secure proportions as high as 25 to 30%.

In general, it is preferred to effect at least a superficial sterilization of the carbohydrate-containing vegetable sections before inoculating them with the selected fungus. This may suitably be effected by subjecting them to heat for a brief period of time, for example, to the action of steam or hot gases while in transit on an open conveyor through a chamber into which the heating medium is supplied or in the chamber in which the fermentation is to take place. If desired, the penetration of the cellular structure of the material by the fungus may be accelerated by preliminarily breaking down, at least to some extent, the cellular structure. This may be readily accomplished, for example, by freezing the slices or sections, then raising them to normal temperatures, say 15 to 30° C. and surface sterilizing them as hereinbefore set forth before inoculating them.

A further improvement in the fermentative action may be effected by providing on the surfaces of the slices or sections a buffer material, generally of alkaline character which does not effect the growth of the fungus, but reacts with and neutralizes the acid formed and thereby directs fermentative action of the fungus resulting from the gradually increasing proportion of acid products of fermentation. Thus, the slices or sections may be superficially powdered with whiting (calcium carbonate), finely divided barium carbonate, zinc oxide, calcium phosphate or the like. In general, it will be sufficient to employ such amounts of the insoluble buffer material as will normally adhere to the surfaces of the slices. Soluble buffer materials may also be employed, but are more limited and less satisfactory in their action.

In carrying out the operation with the carbo-hydrate-containing vegetable substances or slices it is not necessary to follow the seasonal development of the vegetable product in the manufacturing operation. Thus, the sections, for example, of sugar beets, can be dried or dehydrated at the time of gathering, and, when desired for use, soaked to restore their normal moisture content, sterilized as hereinbefore set forth, and subjected to the fermentation operation. They may also be preserved by producing a surface concentration of sucrose or other carbohydrate sufficient to prevent fermentation, this being suitably effected by dipping the slices in hot sugar solutions sufficiently concentrated to form a glace over the surfaces of the slices, or by superficially heating them by directly applied hot gases or superheated steam to dry out the surfaces of the slices and concentrate their carbohydrate content. The slices thus prepared may be preserved, and when desired for use, the excess saccharine concentration at their surfaces may be reduced by soaking them in water. The slices are then prepared for fermentation in the manner hereinbefore set forth.

It is readily apparent that the fermentative action may take place continuously, for example, in an inclined rotary drum, preferably slowly rotated, fed with fresh slices and inoculating material at the upper end and discharging at the lower end.

The period required for the fermentation varies with condition of operation, the specific fungus employed, the temperature of operation and the proportion of oxygen available. Thus, with a selected *Aspergillus niger*, I have secured over 66% conversion of the sucrose presents in sugar beet slices originally ½ inch thick in six days in air and at approximately 25° C. With increased temperature or increased oxygen concentration, a shorter time is required. It is evident that with the specific fungus and a particular vegetable section the optimum period may readily be determined by experiment, determining the percentage yield of the desired acid under the condition determined upon at intervals, charting the results and noting the period after which the increase in yield for each successive period becomes uneconomical. When a buffer material is employed to direct the formation of acid, the tests must be made with such buffer material present in the same manner in which it will be commercially used.

The vegetable slices may likewise be inoculated with spores or tissues derived from a preceding batch of treated slices. In such case, however, at frequent intervals the culture must be tested for their activity in the production of the desired acid from the fructose-yielding carbohydrate, as frequently, the continued re-propagation of a fungus in this manner will result in change in the character of acid produced by its fermentation.

After the fermentation, the fermented vegetable material is pressed or leached out to remove the acid produced during the fermentation, which is, if desired, purified in the usual manner; for example, in the case of citric acid, by neutralization with lime, preferably hydrated lime, to form calcium citrate, precipitation of the citrate and decomposition by sulfuric acid to form the purified acid. Similarly, in the event of the production by the process of other acids, they are pressed or leached out, and may be separated and purified by the ordinary commercial methods.

I claim:

1. The method of producing organic acids by fungicidal action which comprises inoculating sections of plants containing fructose-yielding carbohydrates with a selected acid-producing fungus strain and growing said fungus thereon with exposure to the surrounding atmosphere to convert carbohydrate present to the desired acids.

2. The method of producing organic acids by fungicidal action which comprises breaking down cellular tissue on the surface of sections of plants containing fructose-yielding carbohydrates, inoculating said sections superficially with a selected acid-producing fungus strain and growing said fungus thereon with exposure to the surrounding atmosphere to convert carbohydrate present to the desired acids.

3. The method of producing organic acids by fungicidal action which comprises breaking down the cellular tissue of sections of plants containing fructose-yielding carbohydrates by successive freezing and thawing, inoculating said sections with a selected acid-producing fungus strain and growing said fungus thereon to convert carbohydrate present to the desired acids.

4. The method of producing organic acids by fungicidal action which comprises applying an insoluble buffer material to the surfaces of sections of plants containing fructose-yielding carbohydrates, inoculating said sections with a selected acid-producing fungus strain and growing the fungus thereon to convert carbohydrate of the plant sections to the desired acids.

5. The method of producing organic acids by fungicidal action which comprises applying powdered calcium carbonate to the surfaces of sections of plants containing fructose-yielding carbohydrates, inoculating said sections with a selected acid-producing fungus strain and growing the fungus thereon to convert carbohydrate of the plant sections to the desired acids.

6. The method of producing citric acid by fungicidal action which comprises inoculating sections of sucrose-containing plants with a selected citric acid-producing strain of fungus and growing the fungus thereon with interstices between sections exposed to the atmosphere to convert sucrose of the plant into citric acid.

7. The method of producing citric acid by fungicidal action which comprises applying a powdered insoluble alkaline material to the surface of sucrose-containing plant sections, inoculating the plant sections with a selected citric acid-producing fungus strain and growing the fungus thereon to convert sucrose of the plant section into citric acid.

8. The method of producing citric acid by fungicidal action which comprises breaking down cellular tissue at least superficially of sucrose-containing plant sections, inoculating the sections with a selected citric acid-producing fungus strain and growing the fungus on the sections to convert sucrose therein to citric acid.

9. The method of producing citric acid by fungicidal action which comprises inoculating sugar beet slices with a selected strain of citric acid-producing *Aspergillus niger* and growing said fungus thereon with interstices between slices exposed to the atmosphere to convert sucrose of the beet slices to citric acid.

10. The method of producing organic acids from plants containing fructose-yielding carbohydrates which comprises intermixing cut sections of said plants with inert packing material, inoculating the sections with a selected acid-producing fungus strain and growing said fungus thereon to convert carbohydrate of the plant into the desired acids.

11. The method of producing citric acid by fungicidal action which comprises inoculating sections of plants containing fructose-yielding carbohydrate with a selected citric-acid producing strain of fungus and growing the fungus thereon to produce citric acid.

12. The method of producing organic acids by fungicidal action which comprises inoculating inulin-containing plant sections with a selected acid-producing strain of fungus and growing said fungus thereon to covert inulin present to the desired acids.

13. The method of producing organic acids by fungicidal action which comprises heating sections of plants containing carbohydrates to effect superficial sterilization thereof, and then inoculating said sections with a selected acid-producing strain and growing said fungus aerobically to convert carbohydrates present to the desired acids.

14. The method of producing citric acid by fungicidal action which comprises heating sections of sucrose-containing plants to effect superficial sterilization thereof, then inoculating said sections with a citric acid-producing strain of fungus and growing the fungus thereon to convert sucrose of the plant into citric acid.

In testimony whereof I have hereunto set my hand and seal this 29th day of December, 1928.

FRANK J. CAHN.